United States Patent Office 3,315,676
Patented Apr. 25, 1967

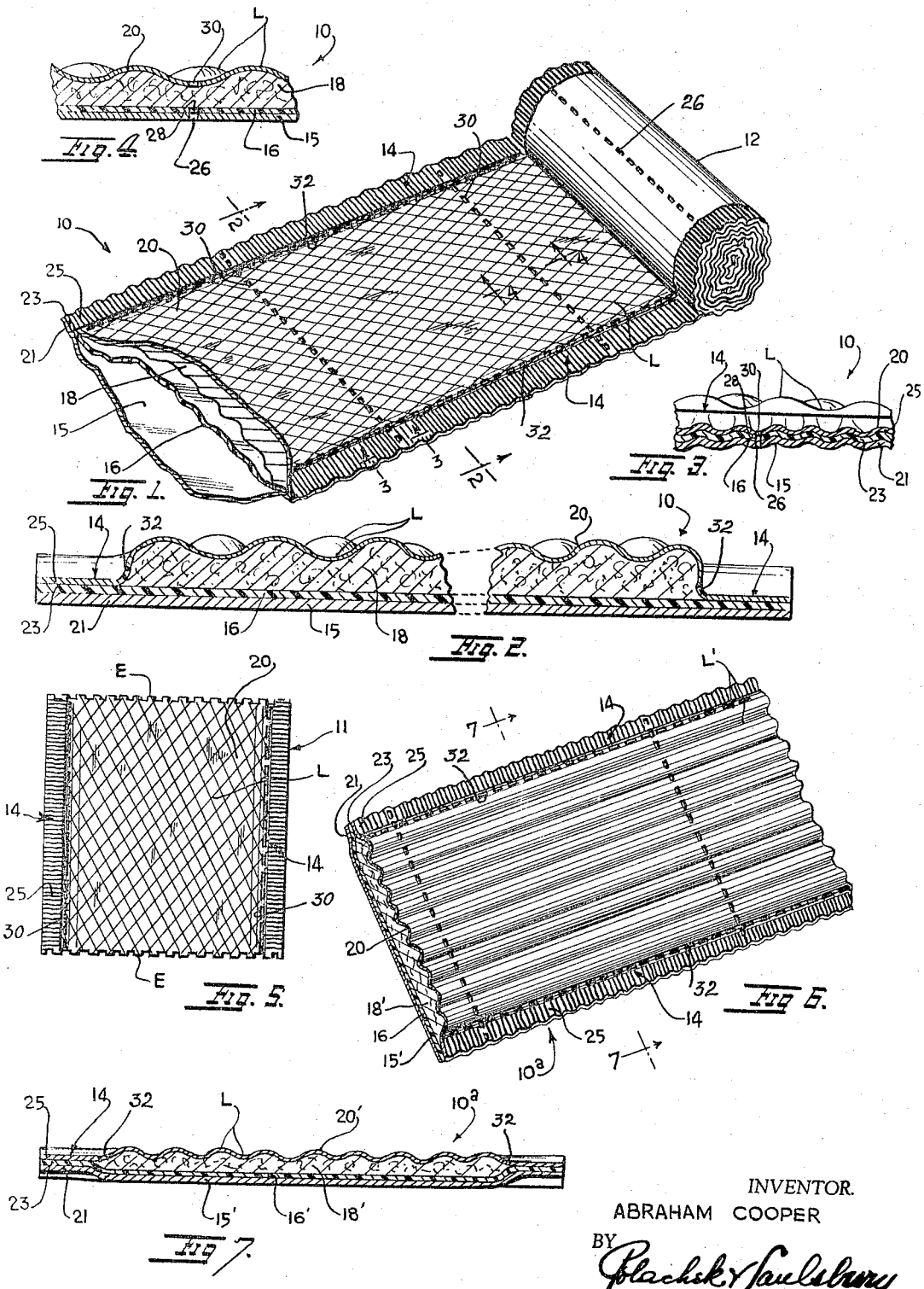

3,315,676
DISPOSABLE DIAPER
Abraham Cooper, 419 Miller Ave.,
Freeport, N.Y. 11520
Filed Sept. 16, 1963, Ser. No. 309,029
2 Claims. (Cl. 128—287)

This invention relates to disposable sheeting and particularly concerns sheeting useful for diapers, for lining infants' cribs, hospital beds, and the like.

According to the invention there is provided a laminated sheeting of extended length which can be wound up in a roll, and unrolled as required. The sheeting is transversely perforated along spaced lines to facilitate tearing off predetermined lengths or sections thereof. The sheeting includes two outer top and bottom paper layers with an intermediate moistureproof plastic layer on the bottom paper layer and an inner layer of fibrous cellulosic material over the plastic layer. The cellulosic material may be alpha cellulose, which is a very absorbent product made from paper or wood pulp. The plastic layer may be very thin polyethylene film about one mil (0.001″) in thickness. The upper paper layer should be porous and have high wet strength imparted by impregnation with resinous material. The lower paper layer should be smooth and with a dull matte finish to minimize sliding when in use on a bed or crib. Outer edges of the sheeting are finished by crimping the edges of the paper and plastic layers together and heat sealing them. The edges are wide to receive pins for attaching parts of the sheeting together to attach edges of the sheeting to bedding. The sheeting is cross or longitudinal quilted.

It is therefore a principal object of the invention to provide a disposable laminated sheeting for covering cribs and beds to protect a mattress and also useful for making diapers.

Another object is to provide a laminated quilted sheeting including two paper layers with inner layers of moisture-proof plastic and fibrous moisture-absorbing wadding, and with edges of the sheeting crimped and heat sealed.

A further object is to provide sheeting as described formed into a roll with transverse spaced lines of perforations to facilitate tearing off predetermined lengths or sections.

For further comprehension of the invention, and of the objects and advantages thereof, reference will be had to the following description and accompanying drawings, and to the appended claims in which the various novel features of the invention are more particularly set forth.

In the accompanying drawings forming a material part of this invention:

FIG. 1 is a perspective view partially in section of a roll of sheeting embodying the invention.

FIG. 2 is a cross-sectional view on an enlarged scale taken on line 2—2 of FIG. 1.

FIG. 3 and 4 are fragmentary sectional views on an enlarged scale taken on lines 3—3 and 4—4, respectively, of FIG. 1.

FIG. 5 is a plan view of a section of sheeting.

FIG. 6 is a perspective view partially in section of another sheeting structure.

FIG. 7 is a cross-sectional view on an enlarged scale taken on line 7—7 of FIG. 6.

Referring first to FIGS. 1–5, there is shown a sheeting 10 of extended length wound into a roll 12. The sheeting has parallel edges 14. The sheeting is a laminated structure having a bottom or outer smooth paper layer 15. Overlaying this layer is a thin moistureproof layer 16 of thermoplastic film. A pad 18 of moisture-absorbing fibrous pulp or paper padding or a wadding in flake form overlays the film 16. A porous paper cover layer 20 having a high wet strength overlays the pad 18. Outer edges 21, 23, 25 of layers 15, 16 and 20 are disposed in registration and secured together by crimping and heat sealing. Spaced lines of registering perforations 26, 28 and 30 are formed in the layers 15, 16 and 20 to facilitate tearing off rectangular sections 11 of the sheeting.

The long edges of layer 20 are perforated as indicated at 32 to facilitate ripping off the layer.

A rectangular section 11 shown in FIG. 5 can be used as a cover for a bed or crib or can be used as a diaper for an infant. During use, moisture will penetrate readily through the porous layer 20 into the moisture-absorbent pad 18. The moisture will not pass the moistureproof barrier film 16. When soiled, the top soiled perforated section 20 of sheeting can be ripped off, then rolled or folded into a small ball and discarded as rubbish or flushed down a toilet.

The sheeting may be cross quilted by intersecting diagonal grooves and ridges L to provide a soft structure. The perforations 26, 28, 30 are punched or cut through the heat sealed, crimped margins 21, 23, 25 as indicated in FIG. 3. Since the plastic layer 16 is thermoplastic it is heat sealed or bonded to the upper and lower layers 20 and 15 at the margins. FIG. 5 shows the serrated edges E left at opposite ends of the rectangular sheet 11 when the sheet section is torn off from the roll 12.

FIGS. 6 and 7 show another sheeting 10ª which is similar to sheeting 10 and corresponding parts are identically numbered. Sheeting 10ª has longitudinal fluted ridges and grooves forming quilting extending along straight parallel lines L' in place of the crossed diagonal quilting L of sheeting 10.

Sheeting 10ª includes bottom paper layer 15', inner plastic film layer 16' overlaying the bottom layer and a top porous paper layer 20' with fibrous moisture absorbent padding 18' between layers 16' and 20'. The transverse perforations 26″ facilitate tearing the sheeting in rectangular pieces. Lateral edges 14 are crimped and heat sealed and are sufficiently wide to receive pins for securing the sheeting to bedding or for securing parts of the sheeting together.

The rectangular sheeting sections can be used as bed or crib covers or as diapers for infants. They are inexpensive and readily disposable. They can be made by high speed laminating machinery, and can be made up in rolls as large as desired for home and hospital use.

One or more layers and/or the padding can be impregnated or coated with germicidal substances. Suitable scents or deodorants may also be applied.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. An infant's diaper or sheeting for cribs, beds and the like, comprising a laminated structure of extended length, said structure including a bottom layer of smooth paper, a film of moistureproof nonporous plastic covering said bottom layer, a pad of moisture-absorbing fibrous material covering said plastic film, and a top layer of porous paper covering the pad, said top, plastic and bottom layers having opposite lateral edges disposed in registration, crimped and heat sealed to each other, and spaced transverse lines of perforations formed in said structure to facilitate tearing said structure into rectangular sections, said pad being quilted with diagonally intersecting ridges and grooves.

2. A diaper or sheeting for cribs, beds and the like, comprising a quilted structure adapted to be rolled, said structure having an extended length, said structure including a bottom layer made of smooth paper, an intermediate layer of moistureproof polyethylene film material completely covering said bottom layer between its opposite lateral edges, a pad of moisture-absorbent cellulosic material covering said film, and a top layer of plasticized porous paper having high wet strength covering the pad adapted to pass moisture into the pad, said structure having spaced transverse lines of perforations in said layers, said perforations being disposed in registration with each other to facilitate tearing said structure into rectangular sections of predetermined length, said top, intermediate and bottom layers having opposite lateral edges disposed in registration and secured together by heat and crimping to retain the pad between the layers, said edges being wide enough to receive pins for securing parts of said structure together, said pad being quilted with diagonally intersecting ridges and grooves.

References Cited by the Examiner

UNITED STATES PATENTS

| | | | |
|---|---|---|---|
| 2,634,229 | 4/1953 | De Wet | 128—284 |
| 2,643,969 | 6/1953 | Mahon | 128—284 |
| 2,649,859 | 8/1953 | Hermanson et al. | 128—287 |
| 2,707,289 | 5/1955 | Taggart | 128—296 |
| 2,897,108 | 7/1959 | Harwood | 161—151 |
| 3,042,043 | 7/1962 | Wuhrlin | 128—284 |
| 3,106,207 | 10/1963 | Dudley | 128—290 |
| 3,192,927 | 7/1965 | Chauviere | 128—287 |
| 3,211,147 | 10/1965 | Pherson et al. | 128—284 |

RICHARD A. GAUDET, *Primary Examiner.*

C. F. ROSENBAUM, *Assistant Examiner.*